United States Patent
Leone et al.

(10) Patent No.: US 8,001,934 B2
(45) Date of Patent: Aug. 23, 2011

(54) PUMP CONTROL FOR REFORMATE FUEL STORAGE TANK

(75) Inventors: Thomas G. Leone, Ypsilanti, MI (US); Robert Walter McCabe, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/756,827

(22) Filed: Apr. 8, 2010

(65) Prior Publication Data

US 2011/0132287 A1  Jun. 9, 2011

(51) Int. Cl.
*F02B 43/08* (2006.01)
*F02B 43/00* (2006.01)

(52) U.S. Cl. ............................................ 123/3; 123/1 A
(58) Field of Classification Search .................. 123/1 A, 123/2, 3
See application file for complete search history.

(56) References Cited

U.S. PATENT DOCUMENTS

| | | | |
|---|---|---|---|
| 2,986,593 A * | 5/1961 | Detrick et al. | 174/12 R |
| 3,204,857 A * | 9/1965 | Weller | 417/458 |
| 5,176,122 A | 1/1993 | Ito | |
| 5,224,452 A | 7/1993 | Tomizawa | |
| 5,372,411 A | 12/1994 | Gerstenmaier et al. | |
| 5,445,019 A | 8/1995 | Glidewell et al. | |
| 5,526,797 A | 6/1996 | Stokes | |
| 5,542,394 A | 8/1996 | Tomisawa | |
| 5,633,458 A | 5/1997 | Pauli et al. | |
| 5,682,864 A | 11/1997 | Shirakawa | |
| 5,740,667 A | 4/1998 | Bhattacharyya et al. | |
| 5,762,366 A | 6/1998 | Faye | |
| 5,857,445 A | 1/1999 | Shimada et al. | |
| 6,024,069 A | 2/2000 | Yoshino | |
| 6,058,906 A | 5/2000 | Yoshino | |
| 6,088,647 A | 7/2000 | Hemberger et al. | |
| 6,176,215 B1 | 1/2001 | Baur et al. | |
| 6,213,104 B1 | 4/2001 | Ishikirlyama et al. | |
| 6,247,449 B1 | 6/2001 | Persson | |
| 6,318,306 B1 | 11/2001 | Komatsu | |
| 6,334,424 B1 | 1/2002 | Ito | |
| 6,349,702 B1 | 2/2002 | Nishiyama | |
| 6,390,030 B1 | 5/2002 | Isogawa et al. | |
| 6,591,817 B2 | 7/2003 | Deutsch | |
| 6,705,295 B1 | 3/2004 | Tarroux et al. | |

(Continued)

FOREIGN PATENT DOCUMENTS

EP  2 048 339 A1  4/2009

(Continued)

OTHER PUBLICATIONS

Leone, Thomas G., et al., "Method for Operating a Charge Diluted Engine" U.S. Appl. No. 12/756,822, filed Apr. 8, 2010, 81204447, FGT093217U01, 87 Pgs.

(Continued)

*Primary Examiner* — Noah Kamen
(74) *Attorney, Agent, or Firm* — Allan J. Lippa; Alleman Hall McCoy Russell & Tuttle LLP

(57) ABSTRACT

Various systems and methods are described for a controlling a flow of reformate fuel in a fuel system which includes a reformer and a storage tank coupled to an engine in a vehicle. The system includes a pump located between the reformer and the storage tank that is selectively operated in order to reduce parasitic losses on the system.

20 Claims, 3 Drawing Sheets

U.S. PATENT DOCUMENTS

| | | | |
|---|---|---|---|
| 6,711,893 | B2 | 3/2004 | Ueda et al. |
| 6,729,301 | B2 | 5/2004 | Nakamori et al. |
| 6,751,543 | B2 | 6/2004 | Gras et al. |
| 6,851,398 | B2 | 2/2005 | Taylor, III et al. |
| 6,964,261 | B2 | 11/2005 | Warne et al. |
| 6,988,481 | B2 | 1/2006 | Sen et al. |
| 6,990,956 | B2 | 1/2006 | Niimi |
| 6,997,142 | B2 | 2/2006 | Wakao et al. |
| 7,047,940 | B2 | 5/2006 | Niimi |
| 7,089,888 | B2 | 8/2006 | Mirji |
| 7,104,244 | B2 | 9/2006 | Nishi et al. |
| 7,159,541 | B2 | 1/2007 | Wakao et al. |
| 7,203,579 | B2 | 4/2007 | Yokota et al. |
| 7,228,841 | B2 | 6/2007 | Takemoto et al. |
| 7,261,065 | B2 | 8/2007 | Aimoto et al. |
| 7,370,609 | B2 | 5/2008 | Kamio |
| 7,454,898 | B2 | 11/2008 | Allgeier et al. |
| 7,523,744 | B2 | 4/2009 | Ayame |
| 7,530,335 | B2 | 5/2009 | Sakurai et al. |
| 7,770,545 | B2 * | 8/2010 | Morgenstern ............ 123/3 |
| 2001/0003977 | A1 | 6/2001 | Hayashi et al. |
| 2004/0139944 | A1 | 7/2004 | Nakano et al. |
| 2008/0010993 | A1 | 1/2008 | Morgenstern |
| 2008/0098985 | A1 | 5/2008 | Kamio |
| 2008/0141984 | A1 | 6/2008 | Haga |
| 2008/0221778 | A1 | 9/2008 | Kakuho et al. |
| 2008/0228375 | A1 | 9/2008 | Ashida et al. |
| 2008/0282998 | A1 | 11/2008 | Kuzuoka et al. |
| 2009/0017987 | A1 | 1/2009 | Saton et al. |
| 2009/0030588 | A1 | 1/2009 | Yamashita |
| 2009/0043479 | A1 | 2/2009 | Noda et al. |
| 2009/0065409 | A1 | 3/2009 | Kamio et al. |
| 2009/0071453 | A1 | 3/2009 | Stockhausen et al. |

FOREIGN PATENT DOCUMENTS

| | | | |
|---|---|---|---|
| JP | 52101318 A | * | 8/1977 |
| JP | 08291774 A | * | 11/1996 |

OTHER PUBLICATIONS

Leone, Thomas G., et al. "Method for Operating and Engine with Variable Charge Density" U.S. Appl. No. 12/756,800, filed Apr. 8, 2010, 81204448, FGT093217U02, 87 Pgs.

Left Blank Intentionally.

Czekala, Michael D., et al., "Ignition Control for Reformate Engine" U.S. Appl. No. 12/756,792, filed Apr. 8, 2010, 81204437, FGT093220, 32 Pgs.

Pursifull, Ross D., "Fuel Injector Diagnostic for Dual Fuel Engine" U.S. Appl. No. 12/756,838, filed Apr. 8, 2010, 81204445, FGT093221, 35 Pgs.

Pursifull, Ross D., "Engine Fuel Reformer Monitoring" U.S. Appl. No. 12/756,845, filed Apr. 8, 2010, 81204434, FGT093222, 37 Pgs.

Gopichandra, Surnilla, et al., "Method for Improving Transient Engine Operation" U.S. Appl. No. 12/756,784, filed Apr. 8, 2010, 81204435, FGT093223, 77 Pgs.

Leone, Thomas G., "Operating and Engine with Reformate" U.S. Appl. No. 12/756,883, filed Apr. 8, 2010, 81204442, FGT093224, 48 Pgs.

Leone, Thomas G., et al., "Method for Operating a Vehicle with a Fuel Reformer" U.S. Appl. No. 12/756,892, filed Apr. 8, 2010, 81204444, FGT093225, 86 Pgs.

Pursifull, Ross D., "Method for Operating an Engine" U.S. Appl. No. 12/756,809, filed Apr. 8, 2010, 81204441, FGT093226, 87 Pgs.

Pursifull, Ross D., et al., "Selectively Storing Reformate" U.S. Appl. No. 12/756,853, filed Apr. 8, 2010, 81204439, FGT093229, 33 Pgs.

Leone, Thomas G., "Reformate Control Via Accelerometer" U.S. Appl. No. 12/756,897, filed Apr. 8, 2010, 81204438, FGT093230, 33 Pgs.

Kerns, James, et al., "Method for Operating an Engine with a Fuel Reformer" U.S. Appl. No. 12/756,858, filed Apr. 8, 2010, 81204433, FGT093231, 33 Pgs.

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 Pgs.

Hoffmann, Walter, et al., "A New Approach to Ethanol Utilization: High Efficiency and Low Nox in an Engine Operating on Simulated Reformed Ethanol", SAE Technical Paper Series No. 2008-01-2415, Powertrain, Fuels, & Lubricants Meeting, Rosemont, IL, Oct. 6-9, 2008, 11 Pgs.

Morgenstern, David A., et al., "Low Temperature Reforming of Ethanol over Copper-Plated Randy Nickel: A New Route to Sustainable Hydrogen for Transportation" revised manuscript received May 4, 2005, pp. 9.

Green Car Congress, "Honda Making Significant Progress on HCCI Engine for Hybrid Application" Oct. 28, 2009, http://www.greencarcongress.com/2005/10/honda_making_si.html, 8 Pgs.

* cited by examiner

PUMP CONTROL FOR REFORMATE FUEL STORAGE TANK

TECHNICAL FIELD

The present application relates to storing a gaseous fuel generated in a reformer for use in an internal combustion engine.

BACKGROUND AND SUMMARY

An ethanol reformer can be used to convert ethanol into a reformate gas (e.g., a gaseous fuel) that has favorable properties for combustion in an internal combustion engine. For example, nitrogen oxide (e.g., $NO_x$) emissions may be reduced and engine efficiency may be improved with the use of reformate fuel. The reformer may not be able to constantly supply a desired amount of reformate to the engine, however; therefore, a storage tank may be utilized to store the reformate after it is generated and before it is injected to the engine.

In order to store a large amount of the reformate while minimizing the size and weight of the storage tank, the reformate can be stored at high pressure. The operating pressure of the reformer may be low in comparison to the high pressure of the storage tank, however, and transfer of the reformate to the storage tank may be difficult under some circumstances. As such, a pump may be used to facilitate transfer of the reformate from the reformer to the storage tank. Use of the pump, however, can impose a parasitic loss on the system which can cause degradation in fuel efficiency, for example.

The inventors herein have recognized the above issues and have devised an approach to at least partially address them. Thus, a method for a fuel system including a reformer and a storage tank coupled to an engine in a vehicle is disclosed. The method comprises, generating a gaseous fuel in the reformer; under a first condition, opening a valve to transfer the gaseous fuel from the reformer to the storage tank; and, under a second condition, operating a pump to transfer the gaseous fuel from the reformer to the storage tank.

In one example, the valve is opened when a pressure in the reformer is greater than a pressure in the storage tank. Further, an engine operating condition, such as spark timing, may be adjusted while the valve is open to further increase the pressure in the reformer and facilitate the transfer of reformate (e.g., gaseous fuel) from the reformer to the storage tank. When the pressure in the storage tank is greater than the pressure in the reformer, however, the pump may be utilized to transfer reformate to the storage tank.

By opening a valve to transfer reformate to the storage tank when pressure in the storage tank is low, operation of the pump may be reduced thereby reducing parasitic losses on the system, while still achieving transfer and storage of increased reformate in the storage tank. As such, a smaller tank may be used to store a larger amount of the reformate at high pressure without significantly reducing system efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling transfer of a gaseous fuel (e.g., reformate fuel) from a reformer to a storage tank based on pressures in the reformer and storage tank. In one example, a pump is utilized to transfer gaseous fuel from the reformer to the storage tank under conditions in which the pressure in the reformer is less than the pressure in the storage tank. When the pressure in the reformer is greater than the pressure in the storage tank, a valve may be opened to allow transfer of the gaseous fuel to the storage tank. Furthermore, in some examples, an engine operating parameter such as spark timing may be adjusted (e.g., retarded) while the valve is open to increase the pressure in the reformer to further assist the flow of gaseous fuel to the storage tank. Thus, use of the pump to transfer gaseous fuel to the storage tank may be reduced resulting in a reduction of parasitic losses on the system.

Figure 1:
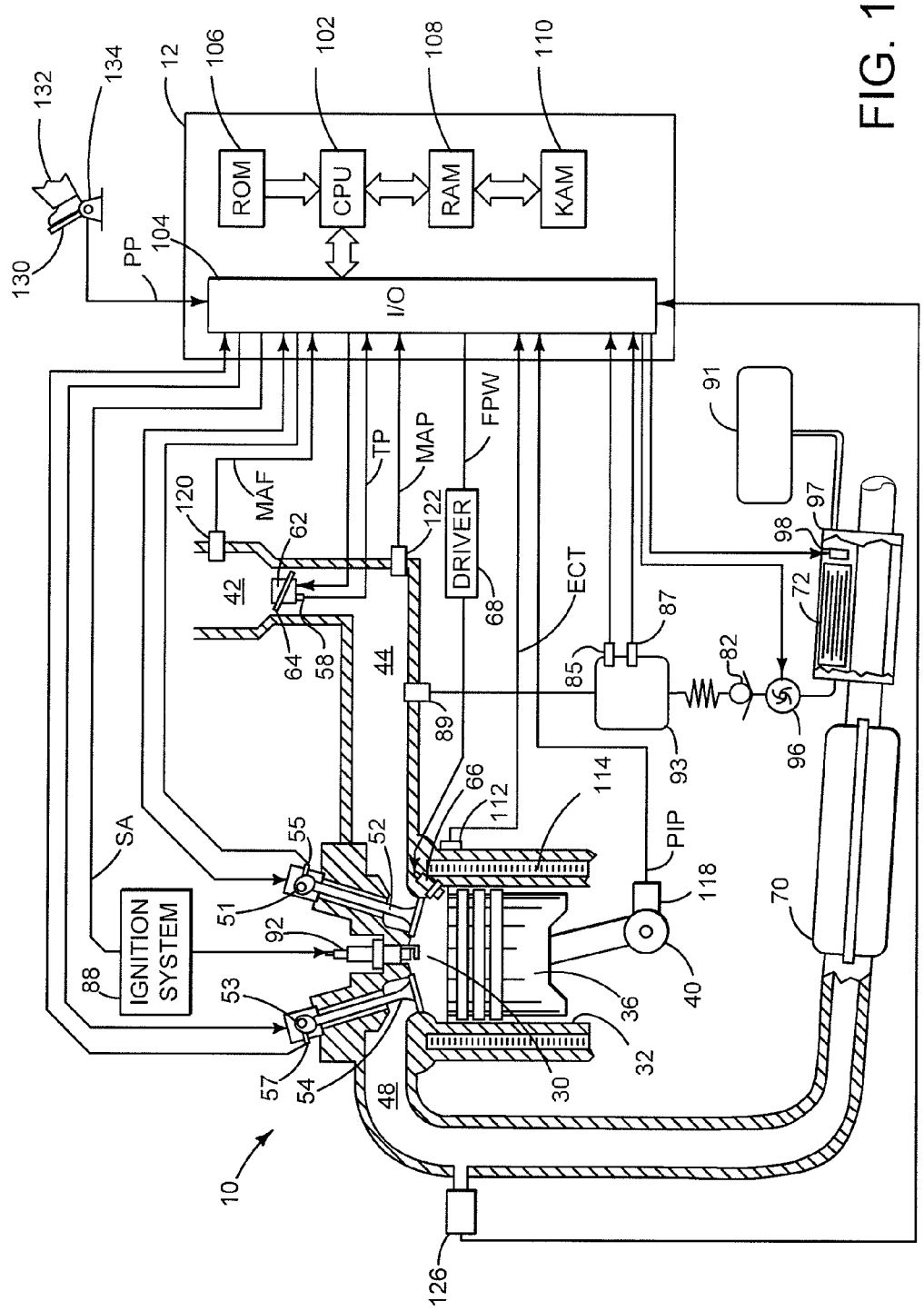
FIG. 1 shows a schematic diagram of an engine including a reformer.

Referring to FIG. 1, internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system including fuel tank 91, fuel pump (not shown), fuel lines (not shown), and fuel rail (not shown). The engine 10 of FIG. 1 is configured such that the fuel is injected directly into the engine cylinder, which is known to those skilled in the art as direct injection. Alternatively, liquid fuel may be port injected. Fuel injector 66 is supplied operating current from driver 68 which responds to controller 12. In addition, intake manifold 44 is shown communicating with optional electronic throttle 64. In one example, a low pressure direct injection system may be used, where fuel pressure can be raised to approximately 20-30 bar. Alternatively, a high pressure, dual stage, fuel system may be used to generate higher fuel pressures.

Gaseous fuel may be injected to intake manifold 44 by way of fuel injector 89. In another embodiment, gaseous fuel may be directly injected into cylinder 30. Gaseous fuel is supplied to fuel injector 89 from storage tank 93 by way of pump 96 and check valve 82. Pump 96 pressurizes gaseous fuel supplied from fuel reformer 97 in storage tank 93. Check valve 82 limits flow of gaseous fuel from storage tank 93 to fuel reformer 97 when the output of pump 96 is at a lower pressure than storage tank 93. In some embodiments, check valve 82 may be positioned upstream of pump 96. In other embodiments, check valve 82 may be positioned in parallel with pump 96. Further, check valve 82 may instead be an actively controlled valve. In such an embodiment, the actively controlled valve would be opened when the pump is operating. The control signal to pump 96 may be a simple on/off signal, for example. In other examples, the control signal may be a continuous variable voltage, current, pulsewidth, desired speed, or desired flowrate, etc. Further, pump 96 may be turned off, slowed down, or disabled with one or more bypass valves (not shown).

Fuel reformer 97 includes catalyst 72 and may further include optional electrical heater 98 for reforming alcohol supplied from fuel tank 91. Fuel reformer 97 is shown coupled to the exhaust system downstream of catalyst 70 and exhaust manifold 48. However, fuel reformer 97 may be coupled to exhaust manifold 48 and located upstream of catalyst 70. Fuel reformer 97 may use exhaust heat to drive an endothermic dehydrogenation of alcohol supplied by fuel tank 91 and to promote fuel reformation.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of reformer tank pressure from pressure sensor 85; a measurement of reformer tank temperature from temperature sensor 87; a measurement of air mass entering the engine from sensor 120; and a measurement of throttle position from sensor 62. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-directional Hall sensor or equivalent, the engine position may be maintained through shut-down, but during re-start an alternative strategy may be used to assure that the engine is rotating in a forward direction.

Figure 2:
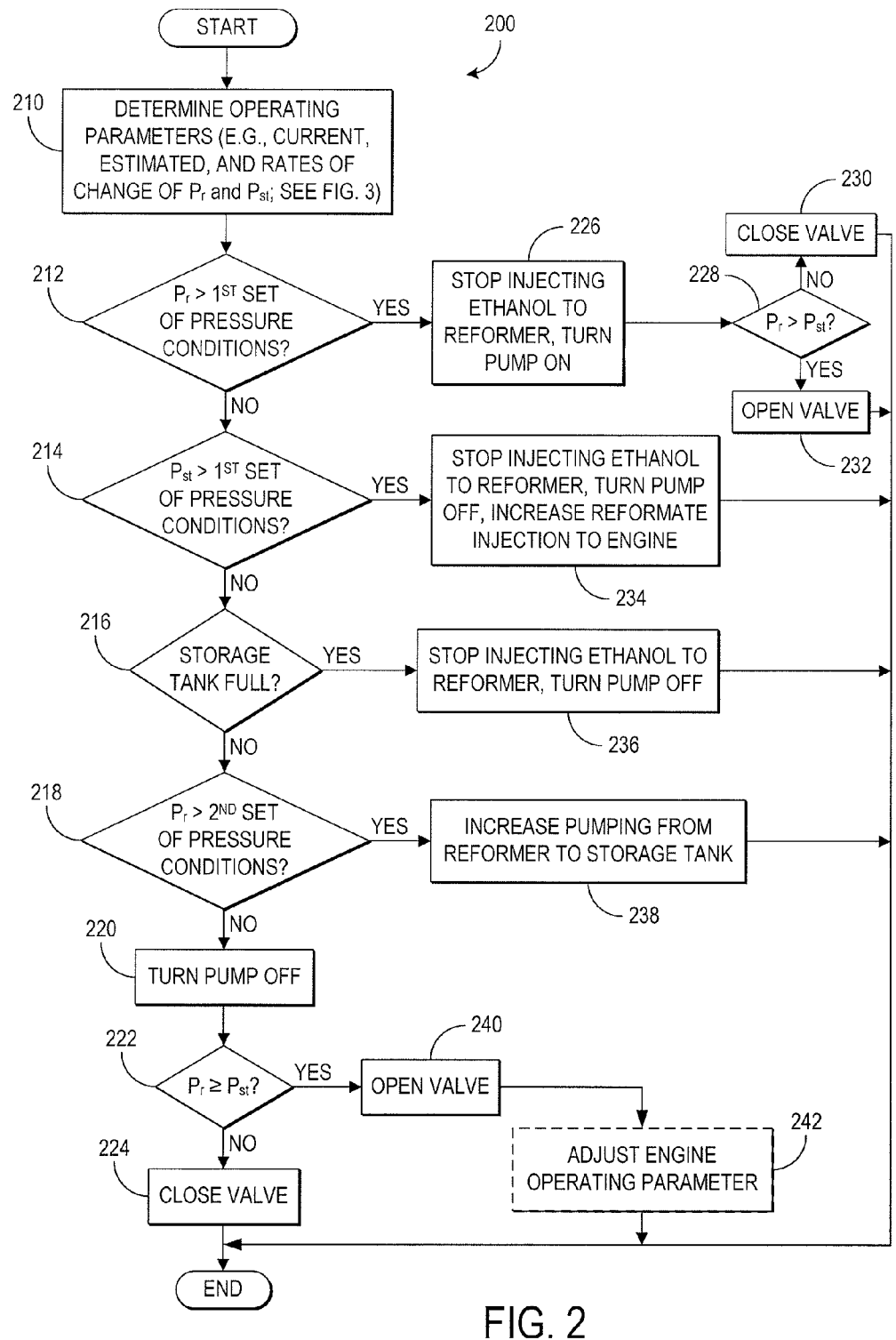
FIG. 2 shows a flow chart illustrating a routine for controlling flow of a reformate fuel.

Continuing now to FIG. 2, a routine 200 for controlling the flow of gaseous fuel between a reformer and a storage tank is shown. Specifically, routine 200 controls the operation of a pump based on the pressures in the reformer and the storage tank. For example, if the pressure in the reformer is greater than the pressure in the storage tank, the pump may be turned off. In this manner, use of the pump may be reduced thereby reducing parasitic losses on the system and increasing the efficiency of the reformer.

At 210 of routine 200, operating parameters are determined. These operating parameters may include current, estimated, and/or rates of change of the pressure in the reformer ($P_r$) and the pressure in the storage tank ($P_{st}$). The pressures may be determined by pressure sensors positioned in the reformer and the storage tank, for example. In some embodiments, the pressures may be estimated based on rates of ethanol injection into the reformer, reformate injection from the storage tank to the engine, temperatures inside the reformer and storage tank, etc. Alternatively, in other embodiments, a parameter other than pressure may be used, such as estimated mass or moles inside the reformer and/or the storage tank. An example method for determining which pressure value (current, estimated, or rate of change) is described later with reference to FIG. 3.

Once the pressures are determined, routine 200 proceeds to 212 where it is determined if the pressure in the reformer is greater than a first set of pressure conditions for the reformer. The pressure conditions may include a threshold pressure for each of the current and estimated pressure values, for example. In another example, the pressure conditions may include a threshold rate of change of the pressure in the reformer. The threshold pressure may be a value close to a maximum allowable pressure in the reformer, for example. In some examples, the threshold pressure may be a function of various temperatures (e.g., exhaust gas temperature, temperature inside the reformer, etc.), age of the system, detected degradation of the system, etc.

If it is determined that pressure in the reformer is greater than the first set of pressure conditions, routine 200 moves to 226 where ethanol injection to the reformer is suspended and the pump is turned on, or pump operation is increased if the pump is already on. Without the injection of ethanol into the reformer, the reaction which generates the reformate fuel is inhibited. As such, the pressure in the reformer may not continue to increase. Moreover, turning the pump on allows reformate to be removed from the reformer and transferred to the storage tank, thereby further decreasing the pressure in the reformer.

After the injection of ethanol to the reformer is suspended, it is determined if the pressure in the reformer is greater than the pressure in the storage tank at 228. For example, the storage tank may only be storing a small amount of reformate, thus the pressure in the storage tank may be low. If the pressure in the reformer is greater than the pressure in the storage tank, reformate can flow to the storage tank without assistance from the pump and the valve is opened at 232. If the pressure in the reformer is less than the pressure in the storage tank, the valve is closed at 230 of routine 200. In this example, the valve is opened or maintained in the open position while the pump is operating to maximize the flow of reformate from the reformer in order to quickly reduce the pressure in the reformer below the threshold value.

If it is determined that the pressure in the reformer is not greater than the first set of pressure conditions for the reformer at 212, routine 200 continues to 214 where it is determined if the pressure in the storage tank is greater than a first set of pressure conditions for the storage tank. The pressure conditions may include a threshold pressure for each of the current and estimated pressures in the storage tank, for example. As another example, the pressure conditions may include a threshold rate of change of the pressure in the reformer. For example, when reformate generation exceeds consumption by the engine, pressures can increase in the reformer and storage tank. As described above, the threshold pressure may be a value close to a maximum allowable pressure in the storage tank, for example. In some examples, the threshold pressure may be based on factors such various temperatures, the size of the storage tank, the age of the storage tank, detected degradation of the storage tank, etc.

If it is determined that the pressure in the storage tank exceeds the first set of pressure conditions, routine 200 moves to 234 where ethanol injection to the reformer is reduced or suspended, the pump operation is reduced or the pump is turned off, and reformate injection to the engine is increased (or commenced if not previously injecting). In this manner, the pressure in the storage tank can be quickly reduced.

Depending on various operating conditions, in some examples only one or two of the above actions may be taken to relieve the pressure in the storage tank. For example, if reformate production is low and the rate of change of pressure in the reformer is small, ethanol injection may not be suspended. Instead, the pump may be turned off and reformate injection to the engine may be increased. In such an example, an amount of reformate injection to the engine may be less than an example in which the pressure or rate of pressure increase in the reformer is high. For example, if the pressure in the reformer is near a threshold pressure and pumping from the reformer to the storage tank is not reduced or suspended, a greater amount of reformate may be injected to the engine in order to relieve the pressure in the storage tank.

On the other hand, if the pressure in the storage tank is less than the first set of pressure conditions, routine 200 proceeds to 216 where it is determined if the storage tank is full. If the storage tank is full, the tank may not efficiently hold additional reformate. As such, the pump is turned off or pump operation is reduced and ethanol injection to the reformer is suspended or reduced at 236. If it is determined that the storage tank is not full and the tank can hold more reformate, routine 200 continues to 218.

At 218 of routine 200, it is determined if the pressure in the reformer is greater than a second set of pressure conditions for the reformer, such as a desired current, estimated, or rate of change of the pressure. Similar to the threshold pressure, the second set of pressure conditions may be based on various temperatures (e.g., exhaust gas), age of the reformer, detected degradation of the reformer, etc. If the pressure in the reformer is greater than desired, pumping from the reformer to the storage tank may be increased at 238. For example, if the pump is already on, the rate of pumping may be increased and, if the pump is off, the pump may be turned on. In some embodiments in which the vehicle is a hybrid vehicle and the pump is an electric pump, for example, the amount of pump increase may be small if the state of charge of the battery is low and the amount of pump increase may be greater if the state of charge is high and there is more energy available. As another example, pumping may be increased a greater amount in a situation in which the rate of change of pressure in the reformer is high compared to a situation in which the rate of change of pressure is low.

If it is determined that the current, estimated, and/or rate of change of pressure in the reformer are less than desired, routine 200 continues to 220 where the pump is turned off or reduced. By turning off the pump, removal of reformate from the reformer is suspended and the rate of change of pressure in the reformer may decrease and, in some examples, pressure in the reformer may not decrease further.

At 222 of routine 200, it is determined if the pressure in the reformer is greater than or equal to the pressure in the storage tank. For example, the amount of reformate stored in the storage tank may be small resulting in a lower pressure in the tank and a greater possibility for transferring reformate to the storage tank via the valve. If the pressure in the reformer is less than the pressure in the storage tank, routine 200 proceeds to 224 and the valve is closed.

On the other hand, if it is determined that the pressure in the reformer is greater than or equal to the pressure in the storage tank, routine 200 of FIG. 2 moves to 240 where the valve is opened. As described above, once the valve is open, reformate can flow from the reformer to the storage tank.

Once the valve is open, routine 200 proceeds to 242 where an engine operating parameter may be adjusted. Adjusting an engine operating parameter may assist in increasing the pressure in the reformer thereby assisting the flow of reformate from the reformer to the storage tank. In one example, the engine operating parameter may be sparking timing and the sparking timing may be retarded. For example, retarding spark timing in at least one cylinder of the engine may increase the temperature of the exhaust gas. Because the reformer relies on heat from the exhaust gas, an increase in exhaust gas temperature may increase the rate of reaction in the reformer leading to an increase in pressure in the reformer.

As described above, the pump can be selectively operated based on the current, estimated, or rates of change of pressures in the reformer and storage tank. By utilizing other ways of transferring reformate fuel from the reformer to the storage tank and only using the pump under selected conditions, such as when the pressure in the reformer is greater than a threshold pressure, parasitic losses on the system may be reduced and the efficiency of the system may be maintained or increased.

Figure 3:
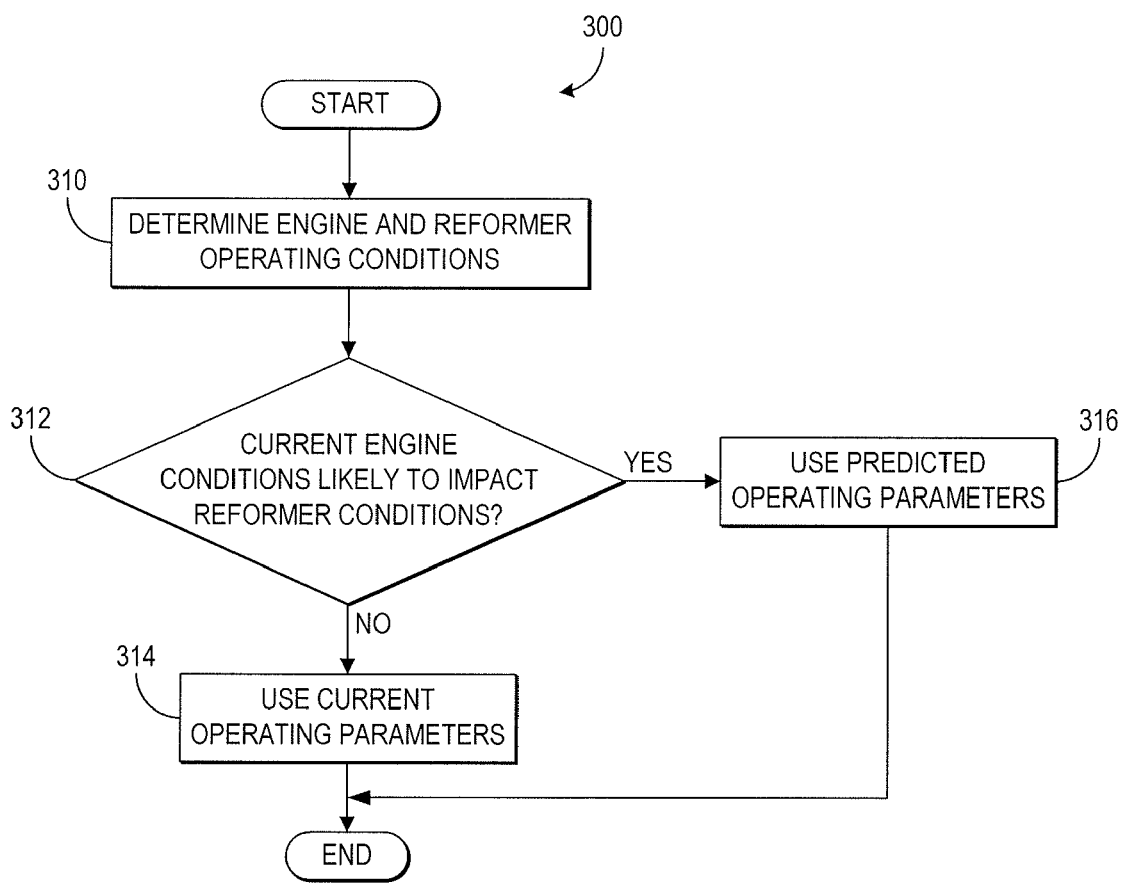
FIG. 3 shows a flow chart illustrating a routine for determining which conditions to use in the routine of FIG. 2.

Referring to FIG. 3, a routine 300 for determining whether to use current or predicted operating parameters in the routine of FIG. 2 is shown. Specifically, routine 300 decides whether to use current or predicted operating parameters based on current operating conditions of the engine and reformer.

At 310 of routine 300, engine and reformer operating conditions are determined. Engine operating conditions may include engine load and exhaust temperature, for example. Reformer operating conditions may include reformer temperature, rate of reformate generation, etc.

Once the operating conditions are determined, routine 300 proceeds to 312 where it is determined if the current engine operating conditions are likely to impact the reformer operating conditions. For example, if current engine conditions are causing the reformer conditions to change rapidly, routine 300 moves to 316 where predicted operating parameters are used. In such an example, fluctuating conditions in the reformer may cause the pressure in the reformer to fluctuate. As such, using an estimated value of the pressure or a rate of change of the pressure during a predetermined period may allow routine 200 in FIG. 2 to be carried out more efficiently than using the current pressure in the reformer.

As another example, if the engine is currently under high load but the exhaust gas has not yet heated up, it may be preferable to estimate what the pressure in the reformer will be once the exhaust gas has heated up. In this manner, pump operation may be reduced or suspended instead of increased or commenced, which may occur if a current value of the pressure is used, and energy may be conserved, for example. Thus, routine 300 moves to 316 and a predicted operating parameter is used.

In contrast, if conditions in the reformer are steady and engine operating conditions are not likely to significantly change them, routine 300 moves to 314 and a current operating parameter is used.

Thus, by deciding whether to use a current or predicted operating parameter in routine 300, the efficiency of routine 200 of FIG. 2 may be maximized.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for a fuel system including a reformer and a storage tank coupled to an engine in a vehicle, comprising:
   generating a gaseous fuel in the reformer;
   under a first condition, opening a valve to transfer the gaseous fuel from the reformer to the storage tank without assistance from a pump; and
   under a second condition, operating the pump to transfer the gaseous fuel from the reformer to the storage tank.

2. The method of claim 1, wherein the first condition includes when a pressure in the storage tank is less than a pressure in the reformer.

3. The method of claim 1, wherein the second condition includes when a pressure in the reformer is greater than a threshold value.

4. The method of claim 3, wherein the pump is turned off when an amount of gaseous fuel in the storage tank reaches a maximum.

5. The method of claim 1, further comprising increasing injection of the gaseous fuel from the storage tank to the engine when a pressure in the storage tank is greater than a threshold pressure.

6. The method of claim 1, wherein the gaseous fuel is derived from alcohol, and the gaseous fuel is injected to a cylinder of the engine in addition to a second fuel.

7. The method of claim 1, further comprising, under a third condition in which a pressure in the reformer is greater than a threshold pressure and the pressure in the reformer is greater than a pressure in the storage tank, opening the valve and operating the pump to transfer gaseous fuel to the storage tank.

8. A method for a reformer and a storage tank coupled to a vehicle engine, comprising:
   generating a gaseous fuel in the reformer;
   under a first condition, opening a valve to flow the gaseous fuel from the reformer to the storage tank while retarding spark timing in an engine cylinder to increase the flow; and
   under a second condition, operating a pump to transfer the gaseous fuel from the reformer to the storage tank.

9. A method for a fuel system including a reformer and a storage tank coupled to an engine in a vehicle, comprising:
   generating a gaseous fuel in the reformer;
   under a first condition, opening a valve to transfer the gaseous fuel from the reformer to the storage tank without assistance from a pump, and adjusting an engine operating parameter to facilitate a flow of gaseous fuel from the reformer to the storage tank when the valve is open; and
   under a second condition, operating the pump to transfer the gaseous fuel from the reformer to the storage tank.

10. The method of claim 9, wherein the first condition includes when a pressure in the reformer is greater than a pressure in the storage tank.

11. The method of claim 9, wherein the second condition includes when a pressure in the reformer exceeds a threshold pressure, and the pump is turned off when a pressure in the storage tank exceeds a threshold value.

12. The method of claim 9, further comprising, under a third condition, opening the valve and operating the pump to transfer gaseous fuel to the storage tank, wherein the third condition includes when a pressure in the reformer exceeds a threshold pressure and a pressure in the storage tank is less than the pressure in the reformer.

13. The method of claim 9, further comprising, when a pressure in the storage tank exceeds a threshold pressure, increasing injection of the gaseous fuel from the storage tank to at least one cylinder of the engine.

14. A method for a fuel system including a reformer and a storage tank coupled to an engine in a vehicle, comprising:
generating a gaseous fuel in the reformer;
under a first condition, opening a valve to transfer the gaseous fuel from the reformer to the storage tank without pump assistance, and retarding a spark timing to increase a flow of gaseous fuel from the reformer to the storage tank; and
under a second condition, operating a pump to transfer the gaseous fuel from the reformer to the storage tank.

15. A system for an engine in a vehicle, comprising:
a reformer;
a storage tank which stores a gaseous fuel generated by the reformer;
a pump positioned between the reformer and the storage tank;
a valve positioned between the reformer and the storage tank; and
a control system comprising a computer readable storage medium, the medium comprising instructions for:
under a first condition, opening the valve to transfer the gaseous fuel from the reformer to the storage tank without assistance from the pump, and adjusting an engine operating parameter to facilitate a flow of gaseous fuel from the reformer to the storage tank when the valve is open;
under a second condition, operating the pump to transfer the gaseous fuel from the reformer to the storage tank; and
under a third condition, opening the valve and operating the pump to transfer the gaseous fuel to the storage tank with assistance from the pump.

16. The system of claim 15, wherein the third condition includes when a pressure in the storage tank exceeds a threshold pressure.

17. The system of claim 15, wherein the gaseous fuel is injected to the engine in addition to a second fuel, and the gaseous fuel is derived from alcohol.

18. The system of claim 15, further comprising instructions for increasing injection of the gaseous fuel to the engine when a pressure in the storage tank exceeds a threshold pressure.

19. The system of claim 15, wherein the first, second, and third conditions are predicted conditions based on estimated values or rates of change detected during a predetermined period.

20. A system for an engine in a vehicle, comprising:
a reformer;
a storage tank which stores a gaseous fuel generated by the reformer;
a pump positioned between the reformer and the storage tank;
a valve positioned between the reformer and the storage tank; and
a control system comprising a computer readable storage medium, the medium comprising instructions for:
under a first condition, when a pressure in the reformer is greater than a pressure in the storage tank, opening the valve to transfer the gaseous fuel from the reformer to the storage tank without assistance from the pump, and adjusting an engine operating parameter to facilitate a flow of gaseous fuel from the reformer to the storage tank when the valve is open; and
under a second condition, when the pressure in the reformer is greater than a threshold pressure, operating the pump to transfer the gaseous fuel from the reformer to the storage tank; and
under a third condition, opening the valve and operating the pump to transfer the gaseous fuel to the storage tank.

* * * * *